United States Patent [19]
Nitta et al.

[11] Patent Number: 5,103,300
[45] Date of Patent: Apr. 7, 1992

[54] ROTARY FILTER COLOR CAMERA WITH CONTROL OF FILTER ROTATION AND PICKUP OUTPUT

[75] Inventors: Keiichi Nitta; Hirofumi Hidari, both of Kawasaki; Kiyoshige Shibazaki, Tokyo; Yasunobu Nakagawa, Yokohama; Junya Yamashita, Tokyo; Takaaki Hashimoto, Noda, all of Japan

[73] Assignee: Nikon Corporation, Tokyo, Japan

[21] Appl. No.: 657,370

[22] Filed: Feb. 19, 1991

Related U.S. Application Data

[63] Continuation of Ser. No. 436,686, Nov. 15, 1989, abandoned.

[30] Foreign Application Priority Data

Nov. 17, 1988 [JP] Japan .................. 63-290869

[51] Int. Cl.⁵ .............................................. H04N 9/04
[52] U.S. Cl. ............................................ 358/41; 358/42
[58] Field of Search ............................. 358/41, 42, 98

[56] References Cited

U.S. PATENT DOCUMENTS

| | | | |
|---|---|---|---|
| 4,368,484 | 1/1983 | Stemme et al. | 358/41 |
| 4,851,899 | 7/1989 | Yoshida et al. | 358/42 |
| 4,878,112 | 10/1989 | Ieoka | 358/98 |
| 4,922,333 | 5/1990 | Nutting et al. | 358/78 |

FOREIGN PATENT DOCUMENTS 61-71790  4/1986  Japan .
61-71791  4/1986  Japan .

Primary Examiner—James J. Groody
Assistant Examiner—Tuan V. Ho
Attorney, Agent, or Firm—Shapiro and Shapiro

[57] ABSTRACT

A camera of the type in which a rotary filter having color filter sections formed for three different colors is rotated between an image pickup and an object and the image pickup repeatedly stores one frame of a video signal therein. The camera comprising a rotation controller, a memory and an output controller. The rotation controller controls the rotation of the rotary filter in such manner that the image pickup scans by at least two frames of the video signal for a certain residence time during which each of the color filter sections is disposed between the image pickup and the object. The output controller controls the outputting of the video signal from the image pickup into the memory. The output controller inhibits the image pickup from outputting into the memory the first frame of the video signal during residence time.

1 Claim, 7 Drawing Sheets

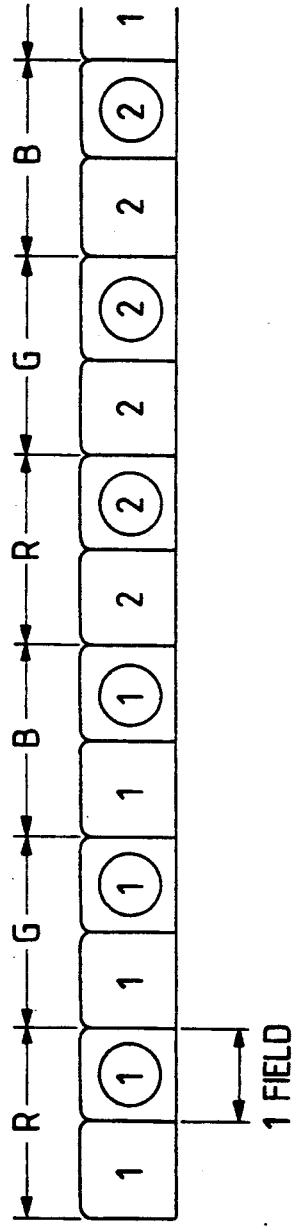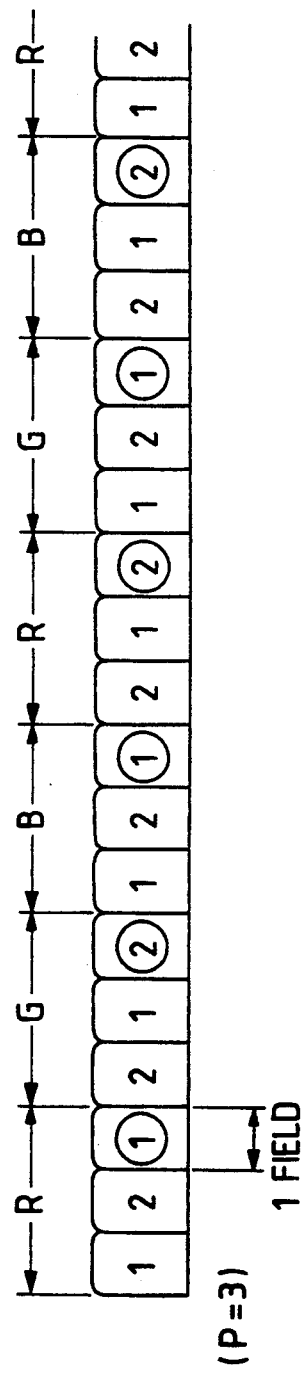

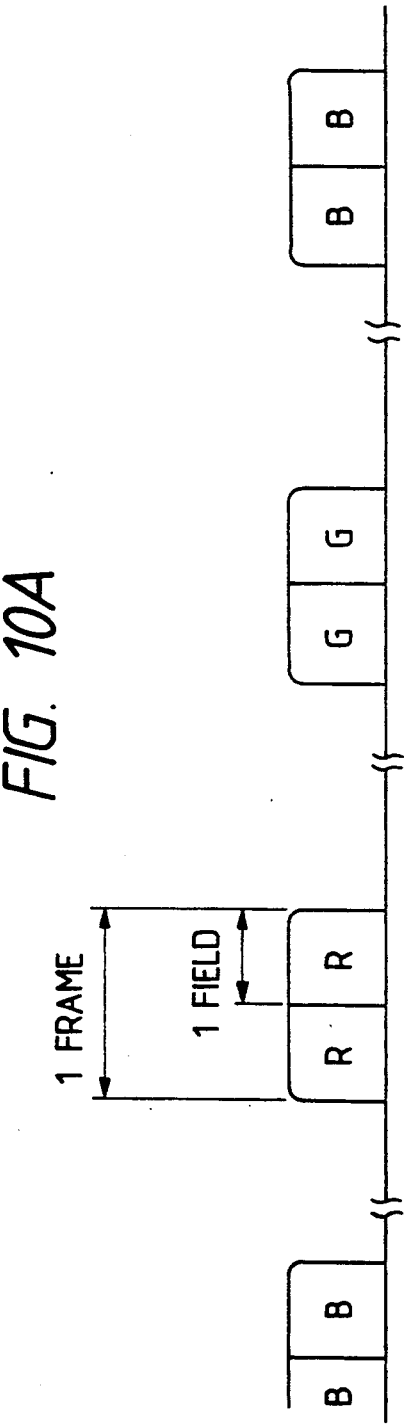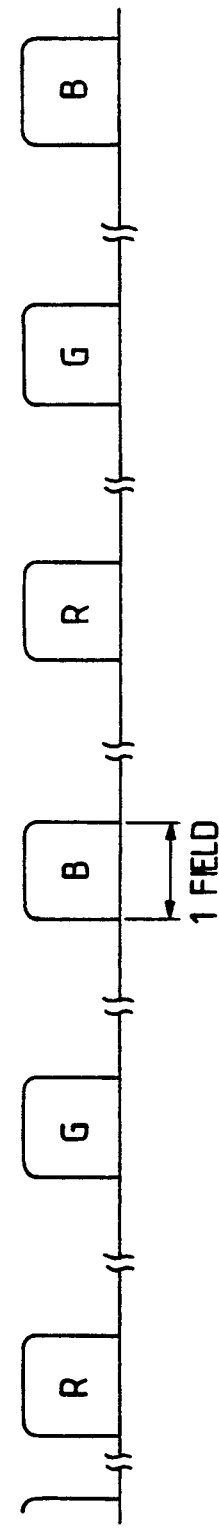

ROTARY FILTER COLOR CAMERA WITH CONTROL OF FILTER ROTATION AND PICKUP OUTPUT

This is a continuation of application Ser. No. 436,686 filed Nov. 15, 1989, now abandoned.

BACKGROUND OF THE INVENTION

1. Field of the Invention

The present invention relates to a rotary filter color camera.

2. Related Background Art

A rotary filter color camera of the prior art is shown in FIGS. 11 and 12.

Referring to FIG. 11, an image pickup element 2 has an image pickup surface 3. Disposed in front of the image pickup surface is a tricolor rotary filter 1 which is rotated at uniform speed by a filter driving system 5. The reference numeral 4 denotes a lead on which a video signal is generated from the image pickup element 2.

In the above-mentioned type of rotary color camera, the tricolor filter is divided into sections for three primary colors respectively. When one of the color filter sections enters the area of the image pickup surface, scanning is carried out only one time for all of the pixels on the image pickup surface. This creates a problem as described hereinafter.

Supposing that a red color filter section is now in front of the image pickup surface and scanning is carried out for all of the pixels passed through the red color filter section, there are produced and stored video signals corresponding to the pixels through the red color filter section. In this phase of operation, it is possible that a portion of the red color filter section may remain in the area of the image pickup surface even after the scanning has been completed. In this case, an extra color signal of the remaining portion of the red color filter section is produced and stored before the next filter section, for example, a green color filter section, comes into the area of the image pickup surface. As the result, the extra color signal of the red filter section is undesirably mixed into the normal video signal output generated during the scanning for the green color filter section now in front of the image pickup surface.

This problem is generally called "color mixing". To minimize the problem of color mixing, various complex geometrical designs have been proposed and used for the prior art rotary color filter. FIG. 12 illustrates an example of a rotary color filter designed according to the prior art.

The rotary color filter 1 shown in FIG. 12 has six color filter sections, namely, R (red), G (green), B (blue), R (red), G (green) and B (blue), and six screen sections designated by 1C.

As readily seen, the rotary color filter 1 is composed of many sections having a very complicated geometrical form.

During the time when one of the color filter sections is in the area of the image pickup surface 3, a non-interlaced scanning of the image pickup surface is carried out one time to read out the stored electric charge resulting from the photo-electrical conversion of an image on the image pickup surface 3. Thus, a video signal is produced on lead 4. In this manner, there are obtained six frame video signals in the sequence of R, G, B, R, G, B during one rotation of the rotary color filter 1.

As described above, the prior art rotary color filter needs to be designed very complicatedly and to be made very precisely. In addition, it needs a timing adjustment means for finely adjusting the timing of scanning of the image pickup surface to the phase of rotation of the rotary filter.

Even when the adjustment of timing is ideally performed, another problem is produced from the particular property of the image pickup element called "afterimage". Due to this afterimage, a remaining signal of a previous frame is mixed into the video signal output now generated. Therefore, the problem of color mixing is unavoidable.

A further problem in the prior art rotary tricolor filter is that of shading resulting from variance of current storage time. Current storage time is the time during which photo-electrically converted charges on the image pickup surface are stored The storage time starts at the entrance of one of the color filter sections in the area of the image pickup surface and continues until scanning of pixels on it. Since the color filter sections have a very complicated geometric form as shown above, the current storage time is variable depending on pixels on the image pickup surface. This variation in current storage time appears on a monitor image display in the form of shading.

SUMMARY OF THE INVENTION

Accordingly, an object of the present invention is to provide a rotary filter color camera which need not be provided with means for the precise adjustment of timing.

It is another object of the invention to provide a rotary tricolor filter having a simple form and suitable for the above-mentioned rotary filter color camera.

It is a further object of the invention to provide a rotary filter color camera in which the possibility of color mixing and shading is negligibly small.

Other objects and advantages of the invention will appear more fully from the following description.

According to the present invention, the above objects are attained by setting a time comprising a plural number of frames as the residence time in the area of the image pickup surface for each filter section of the rotary tricolor filter; reading out stored charges on the image pickup surface a plural number of times and outputting a video signal on and after the second frame.

For the sake of simple description, the time during which each of R (red), G (green), B (blue) filter sections of the rotary tricolor filter is in front of the image pickup surface of the image pickup element is referred to as the residence time. According to the present invention, a certain time length comprising a plural number of frames is set for the residence time. This feature of the present invention enables simplifying the construction of the rotary tricolor filter. Further, it is no longer necessary to additionally provide an adjustment mechanism for the fine adjustment of the timing of scanning to the rotational phase of the rotary filter. Another feature of the invention resides in that a video signal of a color filter section is outputted only after that color filter has come into the area of the image pickup surface and the readout of the stored charges on the image pickup surface has been done a plural number of time, that is to say, a video signal is outputted on and after the second frame of it. This feature enables reducing the undesirable effect of afterimage and decreasing the percentage of the previous signal component mixed into the video signal. Since the afterimage is reduced according to the number of times of the readout of the stored charge, it is possible to decrease the occurrence of color mixing to a negligibly small value.

Furthermore, thanks to the feature that the outputting of a video signal is done on and after the second frame, it is also possible to reduce such shading to a negligibly small level which is caused by the particular shape of the color filter section.

BRIEF DESCRIPTION OF THE DRAWINGS

FIGS. 9A–10B are illustrative views of video signal outputs in the case of interlaced scanning;

DETAILED DESCRIPTION OF THE PREFERRED EMBODIMENTS

Figure 1:
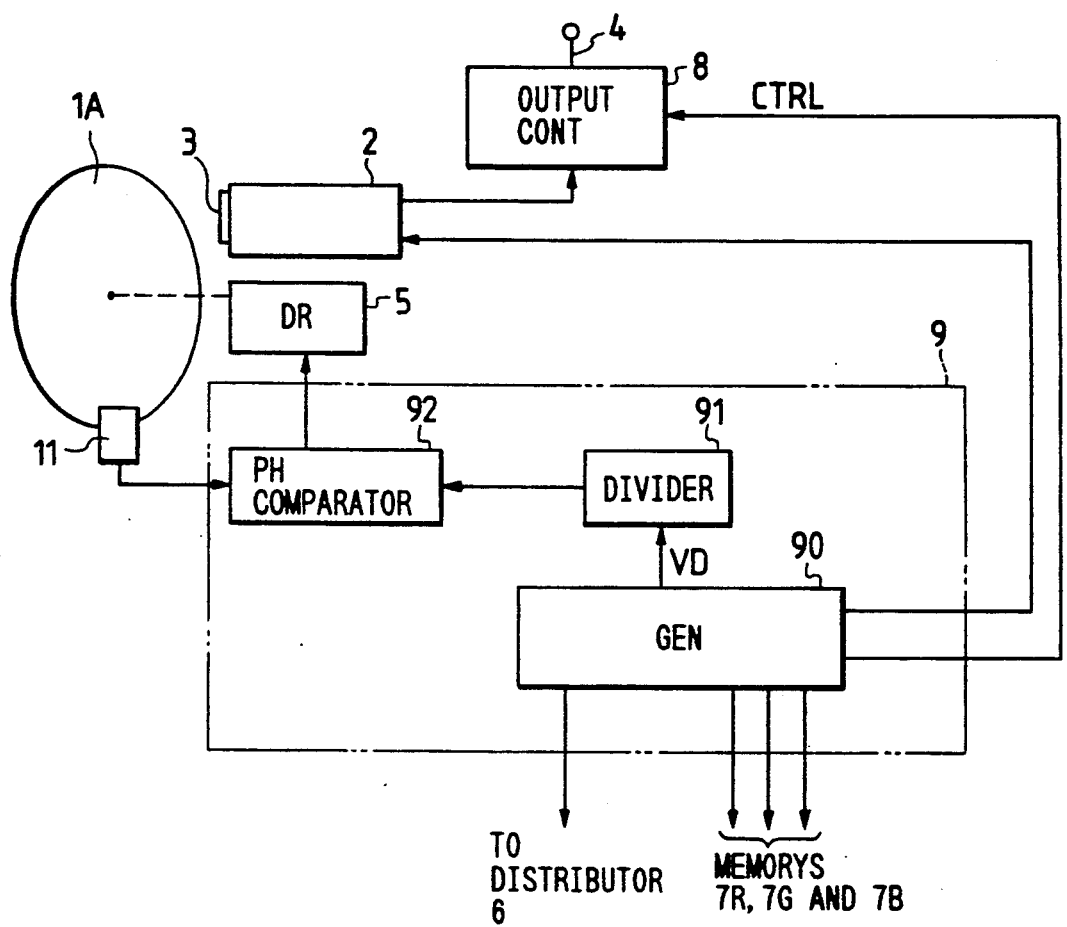
FIG. 1 is a diagrammatic illustration showing the construction of the whole apparatus according to an embodiment of the invention.

An embodiment of the present invention is shown in FIG. 1, which is a diagrammatic illustration of a rotary filter camera generally used for obtaining a still image.

Referring to FIG. 1, the apparatus comprises an image pickup element 2 having an image pickup surface 3. Disposed in front of the image pickup surface 3 is a rotary filter 1A composed of color filter sections for three primary colors. The image pickup element 2 carries out non-interlaced scanning.

The rotary filter 1A is rotationally driven by a filter driving system 5. The rotation of the rotary filter is controlled by a sequence control unit 9 in such manner that each color filter section of the rotary filter is in the area of the image pickup surface 3 for a time comprising a plural number of frames (this time is referred to as the residence time).

The rotary filter 1A has a plural number of slits (not shown) arranged along the margin of the filter so that the rotation of the filter can be detected by a photo-interrupter 11. A synchronizing signal generator 90 generates a vertical synchronizing signal VD which is applied to a frequency divider 91. A phase comparator 92 receives output signals from the frequency divider 91 and the photo-interrupter 11 to synchronize the rotation of the filter 1A with the operation of the image pickup element 2.

Electric charges stored on the image pickup surface 3 are read out by scanning using, for example, an electron beam and outputted as a video signal on lead 4. The outputting of the video signal is, however, controlled by an output control circuit 8. The output control is carried out in such manner that among a plural number of frames of the same color, the second and following frames' signals are outputted as the video signal.

Figure 2:
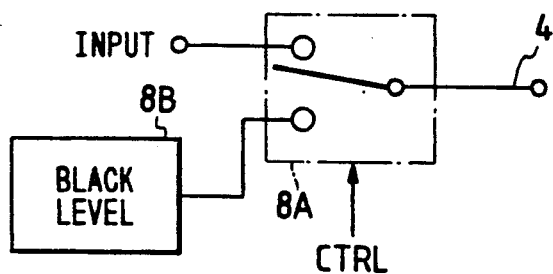
FIG. 2 shows an example of the output control circuit.

As shown in FIG. 2, the output control circuit 2 may be composed of an analog switch 8A and a black level generator 8B. A control signal CTRL from the synchronizing signal generator 90 is inputted to the analog switch 8A. The analog switch outputs an analog signal only when the CTRL signal is at a high level. When the CTRL signal is at a low level, the analog switch outputs a zero level (black level) signal generated from the black level generator 8B.

Figure 3:
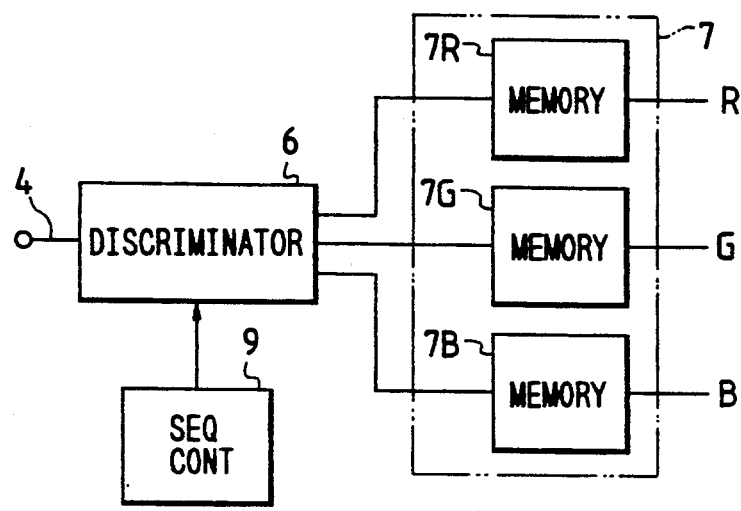
FIG. 3 is a diagrammatic illustration showing the construction of the whole apparatus according to another embodiment.

The output control circuit 8 is not always necessary. In another embodiment shown in FIG. 3, the output control circuit 8 may be omitted. In this embodiment, the video signal on lead 4 is digitized and the digital signal is written in the corresponding one, 7R, 7B or 7G of the frame memories 7 through a discriminator 6. Writing of the video signal into the memory can be controlled by a sequence control unit 9. Therefore, the output control circuit 8 as mentioned above is not always necessary for this embodiment. Further, it is also possible to make the sequence control unit 9 have an additional function as scanning control means. In this case, scanning can be controlled by the sequence control unit 9 in such manner that the stored charges are read out for an optional number of frames selected among a plural number of continuous frames of the same color.

Figure 4:
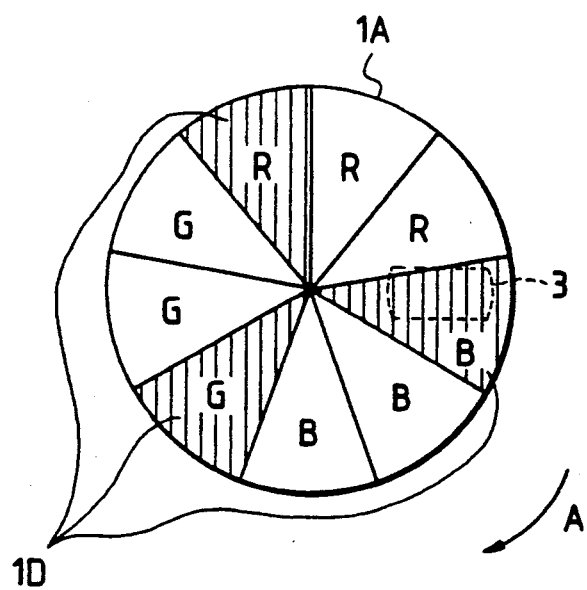
FIG. 4 shows one form of the rotary tricolor filter.

The construction of the rotary filter 1A is shown in detail in FIG. 4.

Referring to FIG. 4, the rotary filter 1A is rotated in the direction of arrow A. The filter 1A is divided into three color sections, R section, G section and B section. Each color section comprises three frames. More specifically, the R section comprises three R frames, G the section comprises three G frames and B section comprises three B the frames. Therefore, in this embodiment, the residence time of one color section is a time corresponding to three frames.

Under the control by the control unit 9, the filter 1A is rotated at uniform speed, and the period of rotation of the filter is set to a multiple of an integer of one frame time x 9. Every last frame designated by 1D is used a video signal readout frame. Scanning is carried out sequentially frame by frame and the stored charges on the image pickup surface 3 are read out frame by frame. In response to the readout of at least the last one frame, the output controller 8 outputs a video signal on lead 4.

Figure 5:
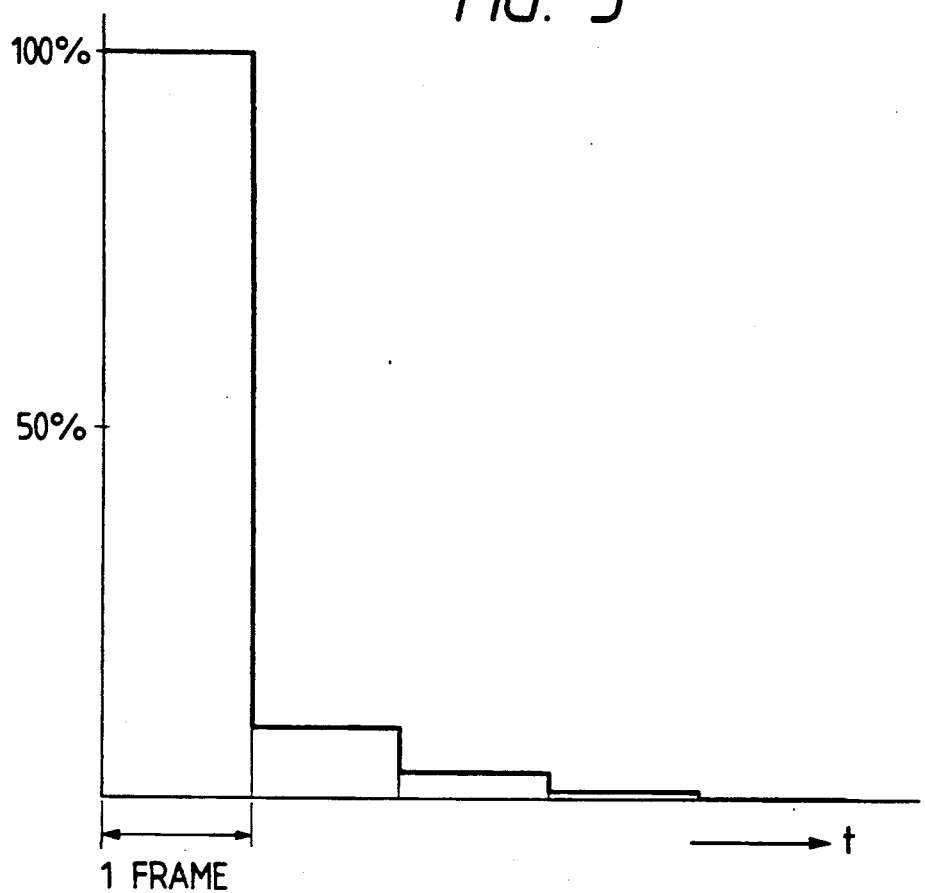
FIG. 5 is a curve showing the afterimage characteristic of an image pickup element.

As seen in FIG. 5, the afterimage on the image pickup element 2 decreases with time. Therefore, the degree of color mixing is reduced in accordance with the length of time from the entering of the color filter section in the image pickup surface 3 to the outputting of the video signal at the last frame 1D.

The readout of the stored charges on the image pickup surface 3 may be controlled in a different manner from the above. For example, it may be done in such manner that the stored charges are read out at the first and third frames of the above-mentioned three frames while no readout is carried out at the middle frame, that is, at the second frame. This mode of control has an advantage in that a sufficient time is available for the storage of charges on the image pickup surface 3 and, therefore, it is possible to take a picture of an object having relatively low brightness.

Figure 6:
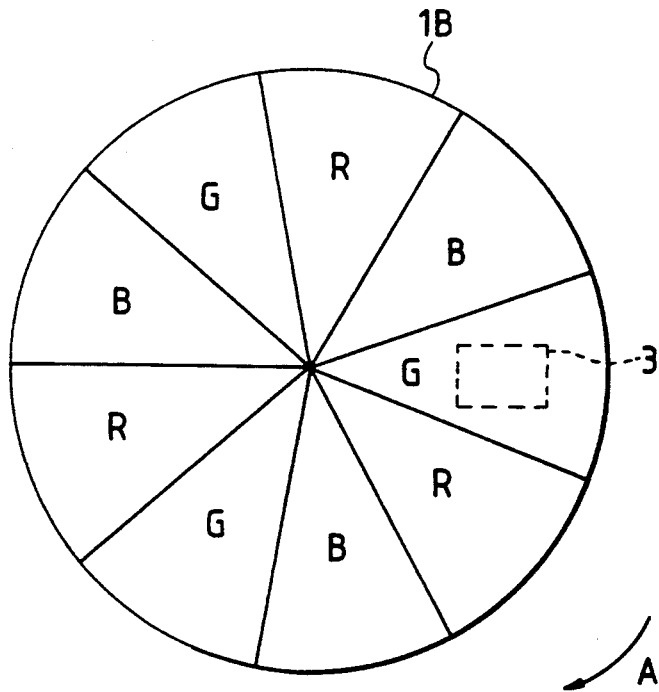
FIG. 6 shows another form of the rotary tricolor filter.

FIG. 6 shows another form of the rotary tricolor filter. The rotary filter 1B shown in FIG. 6 is also composed of nine frames, R, G, B, R, G, B, R, G. But, the area of one color filter section is larger than the area of the image pickup surface 3.

The rotary filter 1B is rotated at non-uniform speed in the direction of arrow A. The filter is stopped every time when a selected color filter section comes in the position just facing the image pickup surface 3. During the stop time, the image pickup surface 3 is scanned several times on a frame basis and the stored charges on the image pickup surface 3 are read out several times a frame basis. At least at the last frame, the output control circuit outputs a video signal.

In this operation mode, a series of operations of the rotary filter 1B is controlled by the controller using a stepping motor as the filter driving system 5.

Compared with the rotary filter 1A, the use of the rotary filter 1B has an advantage in that the number of times of readout of the stored charge previous to the outputting of the video signal can be changed as desired by means of the software of the filter driving system 5 using a stepping motor.

In the embodiment employing the rotary filter 1A as shown in FIG. 4 (the filter is rotated at uniform speed), the number of times of readout is fixed. For example, if the period of rotation of the filter 1A is set to twice, then the number of times of the readout of the stored charge previous to the video signal output frame is fixed to 5. Although the embodiment of the rotary filter 1A lacks flexibility in setting the number of times of readout, it is advantageous compared to the embodiment shown in FIG. 6 in the point that the volume of circuit required is relatively small because there is no need of software control. Therefore, one can select the embodiment of 1A or that of 1B according to the intended application of it, taking into account the merits and demerits thereof.

The manner of operation of the apparatus is as follows.

In case of the embodiment using the rotary filter 1A shown in FIG. 4, the residence time of each color filter section is set to a time corresponding to three frames by the controller 9. The stored charges on the image pickup surface 3 are read out on a frame basis. At the last frame, a video signal on lead 4 is outputted from the output control circuit 8.

In the second embodiment using the rotary filter 1B shown in FIG. 6, the filter 1B is stopped by the controller 9 every time when a selected color filter section enters the area of the image pickup surface 3. The length of stop time is set, for example, to a time corresponding to three frames. The stored charges on the image pickup surface 3 are read out three times. At the last frame, a video signal on lead 4 is outputted from the output control circuit 8.

Figure 7:
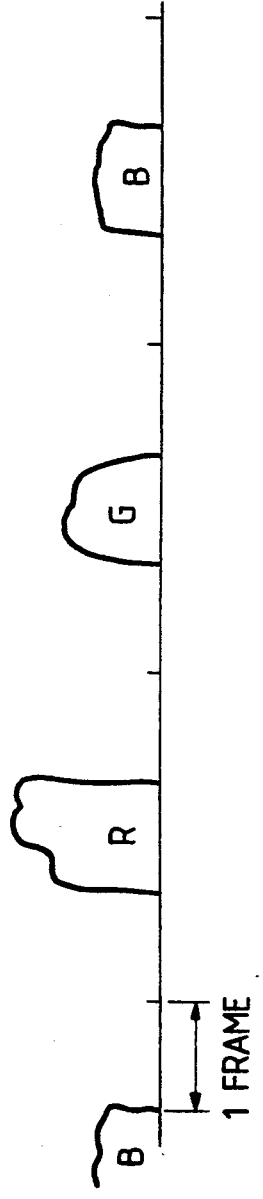
FIG. 7 is an illustrative view of a video signal output.
Figure 8:
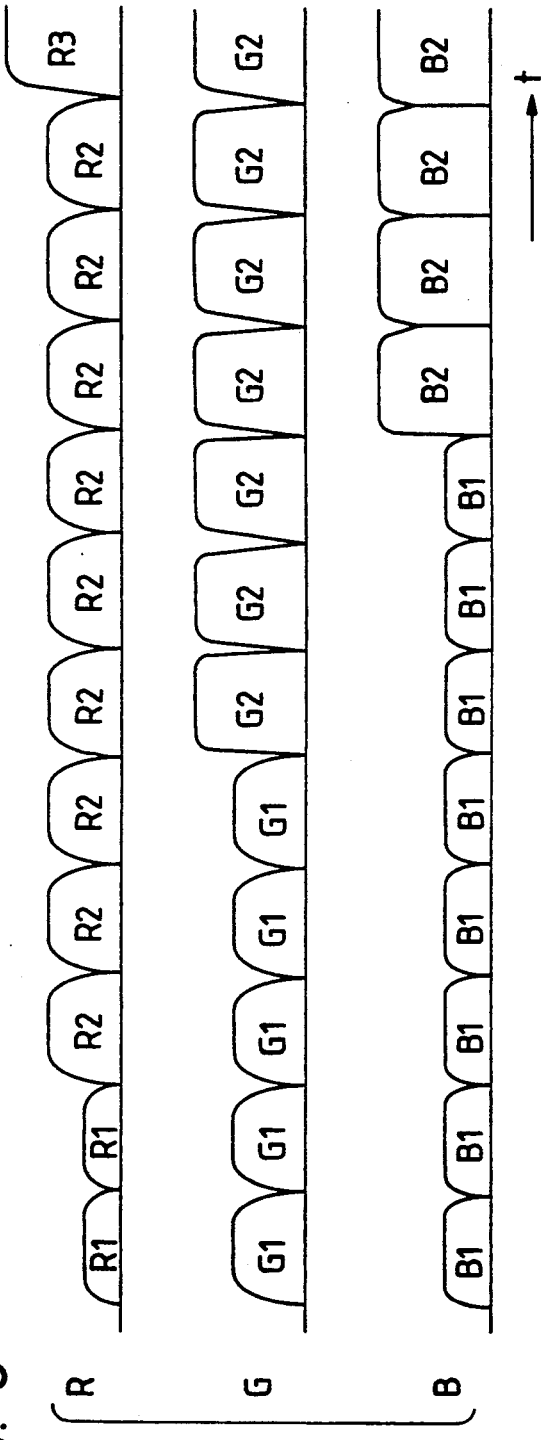
FIG. 8 is an illustrative view of a converted continuous signal.
Figure 11:
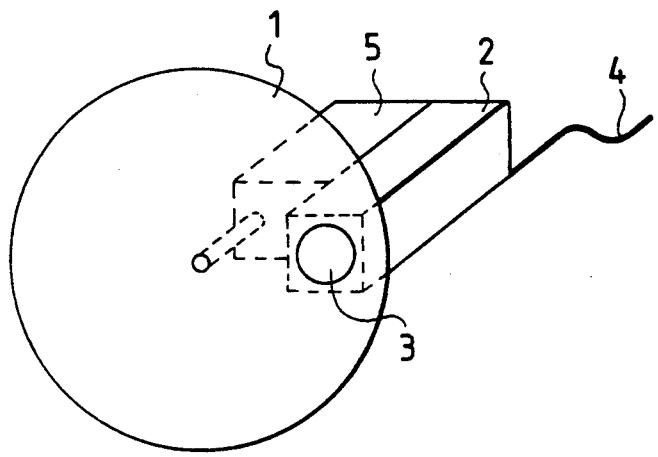
FIG. 11 is a schematic view of a prior art apparatus.
Figure 12:
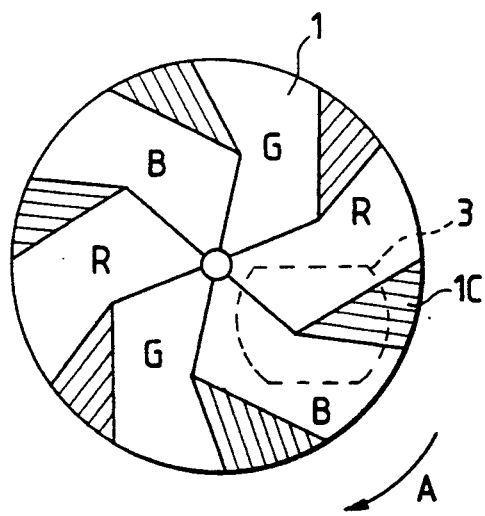
FIG. 12 shows the construction of a rotary tricolor filter according to the prior art.

The video signal obtained in either of the above embodiments is an intermittent signal as shown in FIG. 7. The intermittent signal is distributed to the corresponding frame memories 7R, 7G and 7B through the distributor 6 and written in the memories. By reading out from the three frame memories at the same time, the intermittent signal is transformed into a continuous signal as shown in FIG. 8. As seen from FIG. 8, in regard to one primary color, the same video signal is outputted during the time of nine frames. This means that the rotary filter color camera according to the invention is particularly valuable as apparatus for picking up still images. The apparatus according to the invention is almost free of the trouble of shading resulting from the geometrically complex form of the conventional rotary filter.

In the above embodiments, the image pickup surface 3 is scanned in the mode of non-interlaced scanning However, the scanning can be carried out in the mode of interlaced scanning. A description will be given of the interlaced scanning mode with reference to FIGS. 9A–10B.

FIG. 10A shows a video signal as obtained when an interlaced scanning is carried out on two fields during the time of the frame 1D previously shown in FIG. 4.

FIG. 10B shows a video signal as obtained in the embodiments hereinafter described with reference to FIGS. 9A and 9B.

In the embodiment illustrated in FIG. 9A, every two fields of the image pickup element 2 are scanned for each of the color filter sections, R, G, B. FIG. 9B illustrates another embodiment wherein an ordinary interlaced scanning is carried out with the condition that the residence time of each of the color filter sections, R, G, B constitutes P field period (P is usually an odd number larger than 3, but in FIG. 9B, P=3). In FIGS. 9A and 9B, the mark ① stands for odd number field and ② for even number field.

In the embodiment shown in FIG. 9B, data of 1-field and 2-field are alternately obtained as a video signal. But, by carrying out scanning at least two times for each of R, G, B, there is obtained a video signal of 1- and 2-field. This embodiment of FIG. 9B has an advantage in that the image pickup element 2 can be scanned by the conventional interlaced scanning and no change of scanning system is needed.

The above-shown two embodiments of scanning are not limiting many modifications are possible. For example, the embodiment shown in FIG. 9B can be so modified so that P may be an even number larger than 4. Even in such a modification, the effect of the invention can be obtained by suitably controlling the CTRL signal of the output control circuit 8.

Similarly, the selection of the video signal readout frame is not limiting although the last frame or the last field has been selected as the video signal readout frame in the above embodiments. The second frame or field or any of the following frames may be selected providing that the color mixing and shading can be reduced sufficiently.

As will be understood from the foregoing, the present invention is applicable not only to a non-interlaced scanning system but also to an interlaced scanning system.

We claim:

1. A camera of the type in which a rotary filter having color filter sections formed for three different colors is rotated between an image pickup means and an object, wherein said image pickup means stores frames of a video signal therein and carries out scanning thereof, said camera comprising:

rotating control means for controlling the rotation of said rotary filter in such a manner that the rotation of said rotary filter is stopped for a certain residence period, during which said image pickup means scans at least two frames of the video signal, when each of said color filter sections is between said image pickup means and said object;

memory means; and output control means for allowing said image pickup means to output into said memory means only the last frame of the video signal during said residence period, said output control means inhibiting said image pickup means from outputting into said memory means other frames of the video signal during said residence period.

* * * * *